US010249200B1

(12) United States Patent
Grenier et al.

(10) Patent No.: US 10,249,200 B1
(45) Date of Patent: Apr. 2, 2019

(54) DEPLOYABLE DELIVERY GUIDANCE

(71) Applicant: Amazon Technologies, Inc., Seattle, WA (US)

(72) Inventors: Taylor David Grenier, Seattle, WA (US); Dominic Timothy Shiosaki, Seattle, WA (US); Ricky Dean Welsh, Seattle, WA (US); Richard Philip Whitlock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

(21) Appl. No.: 15/216,958

(22) Filed: Jul. 22, 2016

(51) Int. Cl.
| G05D 1/00 | (2006.01) |
| G08G 5/00 | (2006.01) |
| B64C 39/02 | (2006.01) |
| G05D 1/10 | (2006.01) |
| G01C 21/00 | (2006.01) |

(52) U.S. Cl.
CPC ......... G08G 5/0069 (2013.01); B64C 39/024 (2013.01); G01C 21/005 (2013.01); G05D 1/0088 (2013.01); G05D 1/0094 (2013.01); G05D 1/101 (2013.01); G08G 5/0008 (2013.01); G08G 5/0034 (2013.01); *B64C 2201/128* (2013.01)

(58) Field of Classification Search
CPC combination set(s) only.
See application file for complete search history.

(56) References Cited

U.S. PATENT DOCUMENTS

| 3,917,196 | A | * | 11/1975 | Pond | B64D 39/00 244/135 A |
| 4,025,193 | A | * | 5/1977 | Pond | B64D 39/00 244/135 A |
| 6,144,899 | A | * | 11/2000 | Babb | B64C 13/18 102/384 |
| 6,868,314 | B1 | * | 3/2005 | Frink | B64C 1/00 701/3 |
| 7,210,654 | B1 | * | 5/2007 | Cox | B64C 39/024 244/190 |
| 7,631,833 | B1 | * | 12/2009 | Ghaleb | F41G 7/2233 102/382 |
| 7,637,196 | B2 | * | 12/2009 | Thornton | F41H 11/12 102/402 |
| 9,174,733 | B1 | * | 11/2015 | Burgess | B64D 1/12 |
| 9,305,280 | B1 | * | 4/2016 | Berg | G08G 5/0069 |
| 9,536,216 | B1 | * | 1/2017 | Lisso | G06Q 10/0832 |
| 9,580,173 | B1 | * | 2/2017 | Burgess | B64C 39/024 |
| 9,586,683 | B1 | * | 3/2017 | Buchmueller | B64C 39/024 |
| 9,645,582 | B2 | * | 5/2017 | Shue | G05D 1/105 |
| 9,646,283 | B2 | * | 5/2017 | Kantor | G08G 5/0013 |
| 9,741,255 | B1 | * | 8/2017 | Navot | G08G 5/0082 |

(Continued)

*Primary Examiner* — Jonathan L Sample
(74) *Attorney, Agent, or Firm* — Lee & Hayes, P.C.

(57) ABSTRACT

Delivery area guidance may be provided to an unmanned aerial vehicle (UAV) via one or more delivery area guidance vehicles. For example, a UAV may be programmed to fly to a delivery area (e.g., a neighborhood, a block, a large residential or commercial property, and/or another area associated with landing and/or a delivery). Approaching the delivery area, the UAV may deploy one or more delivery area guidance vehicles. A guidance vehicle may be configured to maneuver a distance from the UAV, and to assist in guiding the UAV into the delivery area to the UAV.

20 Claims, 9 Drawing Sheets

(56) References Cited

U.S. PATENT DOCUMENTS

| | | | |
|---|---|---|---|
| 9,747,808 B2* | 8/2017 | Chambers | B64C 39/024 |
| 9,908,638 B1* | 3/2018 | Vawter | G05D 1/101 |
| 9,969,494 B1* | 5/2018 | Buchmueller | B64D 47/08 |
| 2003/0155463 A1* | 8/2003 | Cox | B64C 39/024 244/3.1 |
| 2004/0068415 A1* | 4/2004 | Solomon | F41H 13/00 89/1.11 |
| 2004/0135031 A1* | 7/2004 | Stupakis | B64C 39/02 244/120 |
| 2006/0011777 A1* | 1/2006 | Arlton | B64C 27/10 244/7 B |
| 2006/0032984 A1* | 2/2006 | Preston | G07F 17/32 244/152 |
| 2008/0277524 A1* | 11/2008 | Brock | B64C 39/024 244/36 |
| 2009/0108135 A1* | 4/2009 | Shaw | B64C 3/30 244/158.3 |
| 2009/0157233 A1* | 6/2009 | Kokkeby | G01S 3/7864 701/3 |
| 2009/0205845 A1* | 8/2009 | Hoffman | A62C 3/025 169/43 |
| 2009/0283626 A1* | 11/2009 | Lutke | B64C 39/024 244/2 |
| 2009/0294573 A1* | 12/2009 | Wilson | B64C 39/024 244/2 |
| 2009/0308979 A1* | 12/2009 | Nadir | B64C 39/024 244/147 |
| 2010/0004803 A1* | 1/2010 | Manfredi | B64D 25/00 701/14 |
| 2010/0193625 A1* | 8/2010 | Sommer | B64C 37/02 244/2 |
| 2010/0198514 A1* | 8/2010 | Miralles | F41G 7/008 701/302 |
| 2010/0237183 A1* | 9/2010 | Wilson | B64C 39/024 244/3 |
| 2011/0035149 A1* | 2/2011 | McAndrew | G05D 1/0038 701/466 |
| 2012/0145833 A1* | 6/2012 | McCann | B64D 17/025 |
| 2013/0048787 A1* | 2/2013 | Riley | B64D 1/08 244/137.1 |
| 2014/0032034 A1* | 1/2014 | Raptopoulos | G08G 5/0069 701/25 |
| 2015/0142211 A1* | 5/2015 | Shehata | H04N 7/181 701/2 |
| 2015/0276353 A1* | 10/2015 | Ueno | F41H 7/04 244/2 |
| 2016/0068267 A1* | 3/2016 | Liu | B64C 39/024 701/11 |
| 2016/0068268 A1* | 3/2016 | Bookless | G06Q 10/20 701/3 |
| 2016/0107750 A1* | 4/2016 | Yates | B64C 39/024 244/2 |
| 2016/0125746 A1* | 5/2016 | Kunzi | G05D 1/0088 701/11 |
| 2016/0214715 A1* | 7/2016 | Meffert | B64C 39/024 |
| 2016/0246304 A1* | 8/2016 | Canoy | G05D 1/0816 |
| 2016/0253908 A1* | 9/2016 | Chambers | B64C 39/024 701/2 |
| 2016/0301859 A1* | 10/2016 | Tebay | G05D 1/0094 |
| 2016/0304217 A1* | 10/2016 | Fisher | B60L 11/1809 |
| 2016/0306356 A1* | 10/2016 | Tebay | G05D 1/0094 |
| 2016/0347462 A1* | 12/2016 | Clark | B64C 39/024 |
| 2016/0356574 A1* | 12/2016 | Tebay | F41G 3/22 |
| 2016/0368610 A1* | 12/2016 | Erickson | B64D 25/00 |
| 2016/0378108 A1* | 12/2016 | Paczan | B64C 37/02 705/330 |
| 2016/0378121 A1* | 12/2016 | Shue | G05D 1/105 701/7 |
| 2017/0090271 A1* | 3/2017 | Harris | G03B 15/006 |
| 2017/0129603 A1* | 5/2017 | Raptopoulos | B64C 39/024 |
| 2017/0227470 A1* | 8/2017 | Cesarano | G05D 1/0214 |
| 2017/0349281 A1* | 12/2017 | Quinlan | B64C 39/024 |
| 2018/0217593 A1* | 8/2018 | Erickson | G05D 1/0088 |

* cited by examiner

DEPLOYABLE DELIVERY GUIDANCE

BACKGROUND

The delivery logistics industry has grown significantly in recent years, as many consumers have recognized the Internet as a preferred source of making commercial purchases due to the convenience of having orders delivered directly to a home or place of business. Currently, the majority of deliveries are conducted manually by delivery personnel going door-to-door. However, the unmanned aerial vehicle (UAV) has great potential as an expedient and energy efficient vehicle for delivering goods to the consumer. For example, after processing an order for a product, a UAV may be loaded with the product as cargo and it may fly to a delivery location, such as a consumer's home or office.

Traditionally, UAVs include cameras and sensors to provide guidance on how to maneuver in a delivery environment. The cameras and sensors are often mounted in a fixed location in the UAV. However, due to the fixed location, the cameras and sensors can often times be blocked by various parts of the UAV and/or cargo carried by the UAV, and/or limited in perspective based on the location on the UAV. As a result, these cameras and sensors may have limitations in ability to provide data to the UAV that facilitates effective guidance of the UAV in some situations. As such, external delivery guidance may be helpful for obstacle avoidance and the successful delivery of the cargo.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4A illustrates the unmanned aerial vehicle (UAV) with the ring-type guidance vehicle coupled to the airframe. FIG. 4B illustrates the UAV with the ring-type guidance vehicle deployed.

FIG. 5A illustrates an unmanned aerial vehicle with a telescopic delivery guidance vehicle. FIG. 5B illustrates an unmanned aerial vehicle with a deployable delivery guidance vehicle that utilizes parachutes to control a vertical speed.

DETAILED DESCRIPTION

Figure 1A:
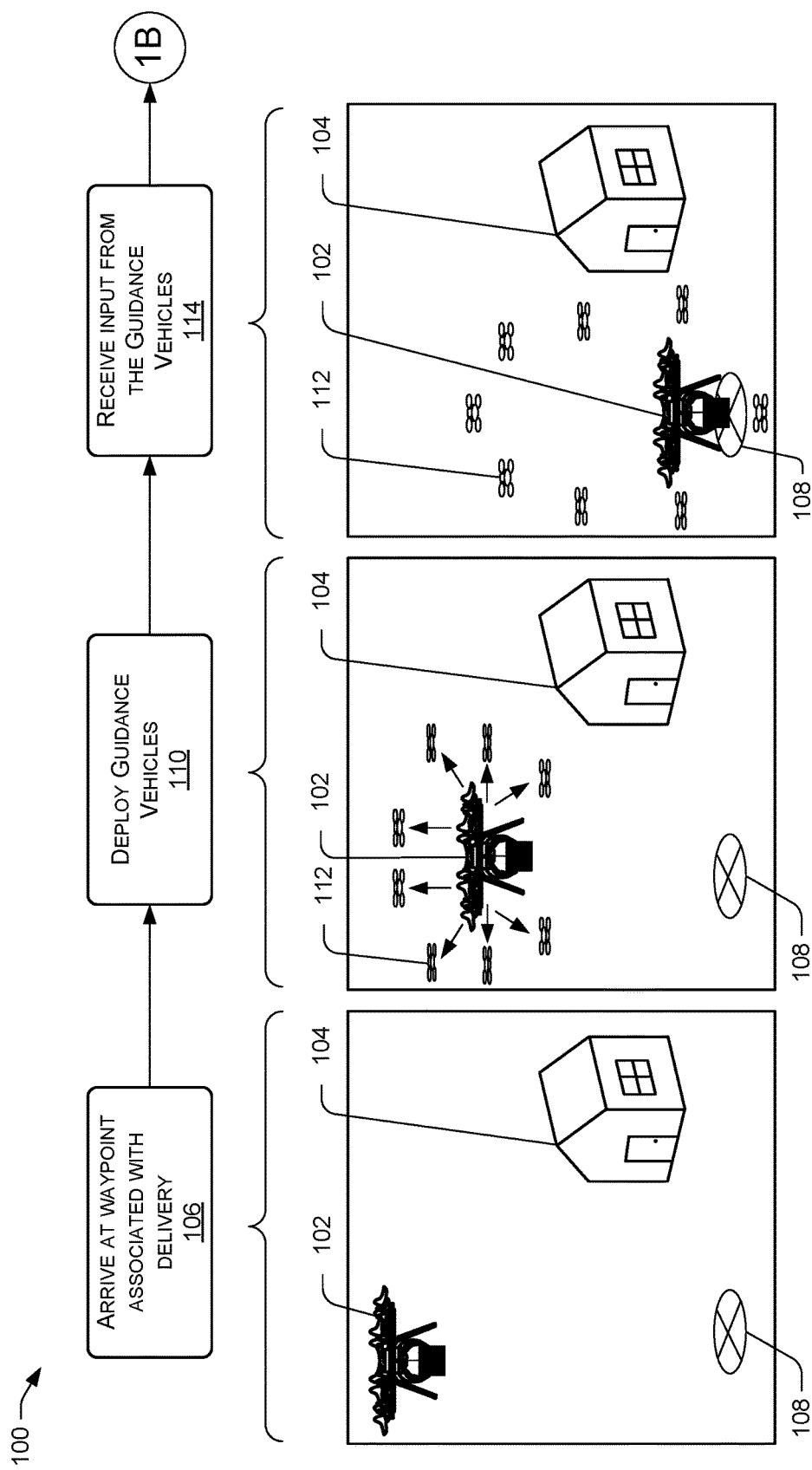
FIGS. 1A and 1B collectively illustrate a pictorial flow diagram of an example process performed by a deployable delivery guidance system.

This disclosure provides methods, apparatuses, and systems for providing delivery area guidance to an unmanned aerial vehicle (UAV) via one or more delivery area guidance vehicles. For example, a UAV may be programmed to fly to a delivery area (e.g., a neighborhood, a block, a large residential or commercial property, and/or another area associated with landing and/or a delivery). Approaching the delivery area, the UAV may deploy one or more delivery area guidance vehicles (guidance vehicles). A guidance vehicle may be configured to maneuver a distance from the UAV, and to assist in guiding the UAV within the delivery area.

In various examples, the guidance vehicle may include a camera system to provide a visual depiction of the delivery area to the UAV. The camera system may capture images (e.g., still images, video, etc.) of the delivery area and send the images to the UAV. A computing system of the UAV may receive the images, and may process the images (e.g., stitch images from multiple camera systems together, etc.) into a combined image for a substantially complete view of the delivery area (e.g., view of an entire delivery area, view of relevant portions of the delivery area, etc.). The UAV may use the view of the delivery area to identify obstacles in the delivery area and/or determine a flight path to a delivery location free from obstacles and/or obstructions.

In some examples, the guidance vehicle may include a sensor to identify obstacles proximate to the delivery area. The obstacles can be stationary obstacles, such as those located in a flight path between the UAV and a delivery location, or mobile, such as an obstacle on the ground near the delivery location, which may move to the delivery location. In some examples, the guidance vehicle may send a signal including obstacle information to the UAV. In such examples, the signal may include an image of the obstacle, a location of the obstacle, such as an actual location (e.g., grid coordinates, latitude/longitude, height above ground, etc.) or a relative location (e.g., location with respect to the delivery location, a UAV location, a flight path, etc.), and/or other relevant information for the UAV to avoid the obstacle. In some examples, the guidance vehicle may emit a laser or other marker to identify a location of an obstacle, such as by shining a laser on the obstacle itself.

In some examples, the guidance vehicle may include a lighting system to illuminate the delivery area. The lighting system can include lights in the visible light and/or infrared spectra. In various examples, the illumination provided by the guidance vehicle may provide lighting to capture images of the delivery area by other guidance vehicles and/or by the UAV itself. In such examples, the camera systems may be able to identify obstacles and/or an obstruction-free approach path during times of low-light, such as at night.

In some examples, the guidance vehicle may include a laser or other apparatus capable of highlighting a delivery location for the UAV. In such examples, the guidance vehicle may direct a laser beam on the delivery location, and designate the delivery location as a target for the UAV to deliver cargo. A sensor on the UAV may recognize the laser beam, such as a particular reflective pulse of laser light, and may approach the specific location for delivery.

The apparatuses, techniques, and systems described herein may be implemented in a number of ways. Example implementations of the deployable delivery guidance system are provided below with reference to the following figures.

Figure 1B:
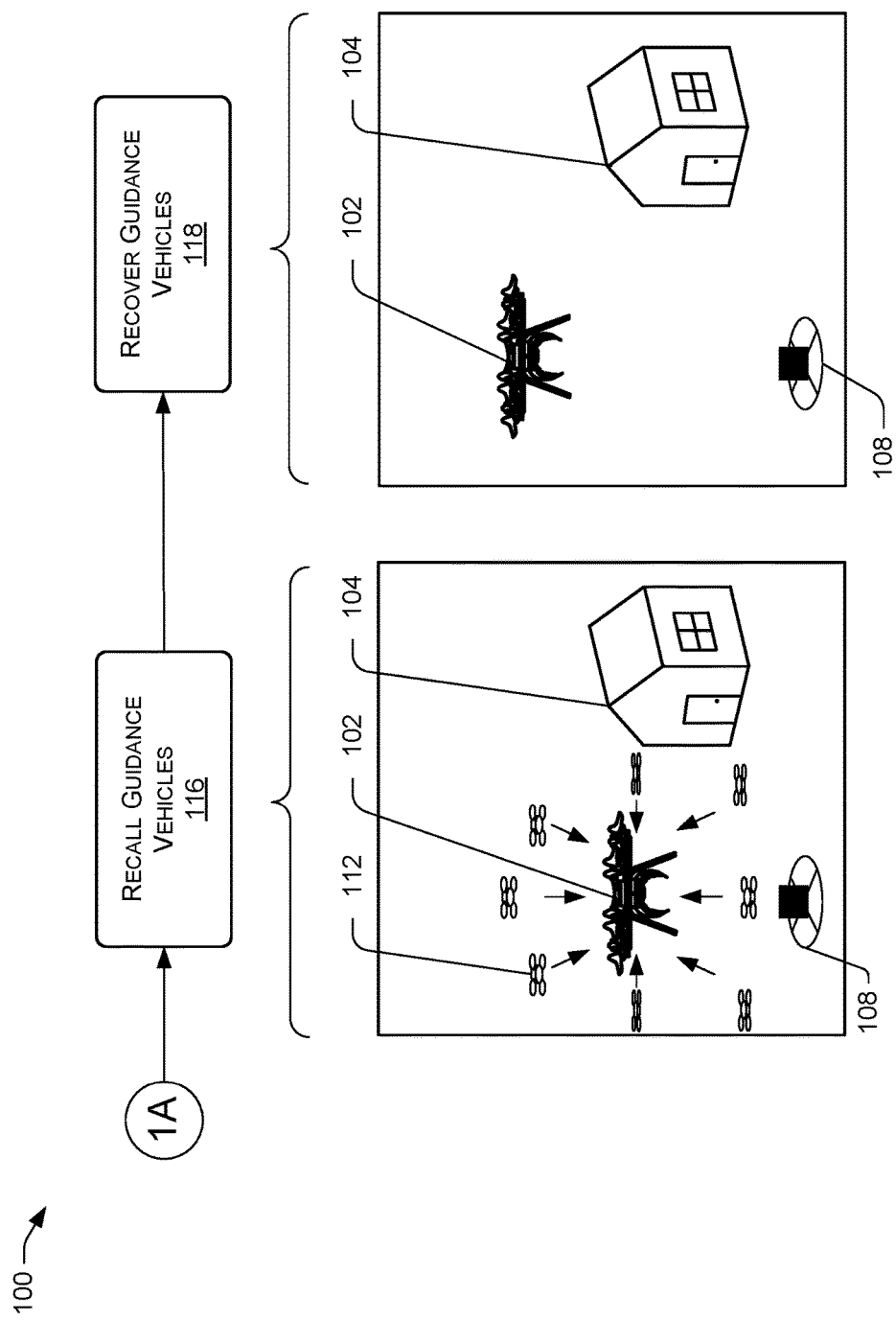

FIGS. 1A and 1B collectively illustrate a pictorial flow diagram of an example process 100 of a deployable delivery guidance system.

In various examples, the process 100 may apply to an unmanned aerial vehicle (UAV) 102 delivering a package to a destination 104 associated with a customer. In such examples, the UAV 102 may be programmed to fly to a waypoint associated with the delivery. At 106, the UAV 102 may arrive at a waypoint associated with the delivery. The waypoint may include coordinates (e.g., latitude, longitude, degrees minutes seconds, Universal Transverse Mercator, etc.) and/or altitude in proximity of the destination 104 (e.g., a house, a place of business, etc.), such as coordinates associated with a delivery location 108.

At 110, the UAV 102 may deploy guidance vehicles 112. The guidance vehicles 112 may include micro-UAVs capable of self-propulsion, micro-UAVs capable of controlling a vertical descent, camera and/or sensor systems coupled to the UAV 102, or a combination thereof.

In some examples, the guidance vehicles 112 can be stored away from the UAV 102, such as in a neighborhood storage facility. In such examples, the UAV 102 may send a signal to the guidance vehicles 112 to launch to the delivery area. In various examples, the guidance vehicles 112 can be stored inside an airframe of the UAV 102 during flight to the waypoint associated with the delivery. In such examples, the UAV 102 can deploy the guidance vehicles 112, such as by opening a compartment door (e.g., docking station door) of the UAV 102 and sending a signal to the guidance vehicles 112 to launch. In some examples, the guidance vehicles 112 can be autonomous micro-UAVs.

In various examples, the guidance vehicles 112 can be coupled to the airframe. In some examples, the coupling can be a cable or a wire connecting the UAV 102 and the guidance vehicle 112. In such examples, the guidance vehicle 112 may fly away from the UAV 102, but may maintain a wired connection to send and receive data (e.g., flight data, imagery, obstacle data, etc.). In such examples, the UAV 102 may deploy the guidance vehicle by extending the cable or wire.

As depicted below in FIG. 5A, the guidance vehicles 112 can be coupled to the airframe via connection arms, such as telescopic arms affixed to the airframe. In such examples, the UAV 102 can deploy the guidance vehicles 112 by extending the telescopic arms away from the airframe. As depicted below in FIGS. 4A and 4B, the connection arms can be coupled to the airframe via releasable connections. In such examples, the UAV 102 can deploy the guidance vehicles 112 by releasing the connections.

In some examples, the UAV 102 can deploy a single guidance vehicle 112. The single guidance vehicle 112 can be positioned at an altitude above the UAV 102 (e.g., 10 feet, 50 feet, 100 feet, etc.). In various examples, the single guidance vehicle 112 can be configured to fly and/or be extended via telescopic arm a distance (e.g., 2 meters, 5 feet, 10 feet, etc.) above the UAV 102. In some examples, the single guidance vehicle 112 can fly based on a vertical descent configuration (e.g., parachute size, material, etc.).

In various examples, the UAV 102 may deploy a plurality of guidance vehicles 112 (e.g., 2, 4, 5, 12, 13, etc.). For example, the UAV 102 may deploy six pairs (12) of guidance vehicles 112. Four of the six pairs may be programmed to fly to a position in a cardinal direction (e.g., north, east, south, west) from the UAV 102, while one pair may fly above and one pair may fly below the UAV 102. For another example, each pair of the six pairs may be programmed to fly to an axis (X-Y-Z) position relative to the UAV 102. In such examples, pairs of guidance vehicles 112 may be positioned in front of, behind, to the sides, above, and below the UAV 102.

Additionally or alternatively, the UAV 102 may deploy one or more guidance vehicles 112 configured to land proximate to the delivery location 108. The one or more guidance vehicles 112 may land via powered flight, a parachute material, and/or other means of effecting a controlled descent.

At 114, the UAV can receive input from the guidance vehicles 112. The input can include images of the delivery area, obstacle identification, identification of the delivery location, illumination of the delivery location, and the like.

In various examples, the guidance vehicle 112 can include camera systems capable of capturing images of the delivery area. In such examples, the input can include images of the delivery area. The UAV 102 can receive a plurality of images from the guidance vehicles 112, and can process the images into a combined image (e.g., stitch together) to generate a substantially complete picture of the delivery area. The UAV 102 can use the substantially complete picture of the delivery area to identify obstacles and/or determine an obstacle free flight path to the delivery location 108.

In some examples, the UAV can receive the plurality of images and send the plurality of images to a central processing system. The central processing system can include computing resources and/or human input to process the images (e.g., inspect images to determine obstacles, determine delivery location, etc.). The central processing system can be configured to receive images from various UAVs, and queue the images based on an urgency of the task associated with the images. The central processing system can process the images in order based on the queue, and send data corresponding to the images to the respective UAV. Responsive to receiving the data, the UAV can update an operation (e.g., delivery path, delivery location, hover height, obstacle avoidance, delivery area illumination, etc.).

In various examples, the guidance vehicles 112 can include sensors to detect obstacles in the delivery area. In such examples, the input can include data regarding the obstacles (e.g., a location of the obstacle, a height, and/or other relevant obstacle information). The obstacles can be stationary obstacles (e.g., a clothes line, a swing set, a barbeque, or other stationary obstruction) and/or mobile obstructions (e.g., an animal, a flying disc, etc.). In some examples, the obstacles and/or obstructions can be those located in a flight path between the UAV 102 and the delivery area 108. Additionally, the guidance vehicles 112 may be configured to detect and send input of identified obstacles and/or obstructions outside the flight path.

In various examples, the guidance vehicles 112 can include a laser or other apparatus capable of highlighting a location. In such examples, the input can include data related to the laser or other apparatus. In some examples, the laser or other apparatus can be configured to identify a location of an obstacle and/or an obstruction, such as by shining the laser on the obstacle and/or obstruction itself. In various examples, the laser or other apparatus can direct a beam on the delivery location 108, and designate the delivery location 108 as a target of the UAV to deliver the package. In such examples, a sensor on the UAV 102 can recognize the beam, such as a particular pulse of laser light, and may approach the specific location for delivery.

In various examples, the guidance vehicles 112 can include lighting systems to illuminate the delivery area. In such examples, the input can include the illumination from the lighting systems. The lighting systems can include lights in the visible light spectrum and/or the infra-red spectrum. In various examples, the lighting systems can provide illumination for the camera systems to capture images in a low-light environment. In some examples, the lighting systems can illuminate an object in a direction that causes a shadow. In such examples, a sensor in the guidance vehicle 112 and/or the UAV 102 can determine, based on the shadow, a size and/or shape of the object.

Based on the input received from the guidance vehicles at 114, the UAV 102 can approach the delivery location 108, and deliver the package.

At 116, the UAV 102 can recall the guidance vehicles 112. In some examples, the UAV 102 can send a signal to the guidance vehicles 112 to return to a location proximate to the UAV 102, and/or proximate to a storage location (e.g., neighborhood storage facility). In various examples, the UAV 102 can recall the guidance vehicles 112 by retracting a cable, wire, or telescopic arm to which the guidance vehicle 112 is coupled.

At 118, the UAV 102 can recover the guidance vehicles 112. In various examples, the UAV 102 can open respective compartments (e.g., docking stations) for the guidance vehicles, and can recover the guidance vehicles 112 into the respective compartments. In some examples, the UAV 102 can include a device to assist in recovering the guidance vehicles, such as a telescopic arm with a magnet and/or gripping mechanism. In such examples, the device can connect to the guidance vehicle 112, and lead (e.g., pull, guide, etc.) the guidance vehicle 112 into the compartment. For example, the UAV 102 can land proximate to or hover over a location of a landed guidance vehicle 112. The device can connect to the landed guidance vehicle 112 and recover the vehicle onto the UAV 102. For another example, an autonomous guidance vehicle 112 may fly to a position proximate to the docking station of the UAV. The device can then connect to the guidance vehicle 112 located proximate to the UAV 102, and can recover the vehicle into the UAV 102. In some examples, the UAV 102 can employ a delivery mechanism (e.g., a releasable clamp, a hook, a tether, or other mechanism capable of securing a package and/or the guidance vehicle 112) to recover the guidance vehicle 112. In such examples, after delivering the package, the delivery mechanism can connect to and secure the guidance vehicle 112 to the UAV 102 prior to returning to a base station (e.g., warehouse facility, etc.).

In various examples, the UAV 102 may send a signal to the guidance vehicles 112 to fly into respective compartments. In such examples, the signal may include an order of recovery, directing individual guidance vehicles 112 to recover in a particular order. For example, a UAV 102 may include two docking stations configured to recover six guidance vehicles 112, three guidance vehicles 112 per docking station. The UAV 102 may direct pairs of guidance vehicles 112 into the respective docking stations until the six guidance vehicles are recovered.

In some examples, the UAV 102 may cause the guidance vehicles 112 to be recovered at a storage location (e.g., neighborhood storage facility). In such examples, the UAV 102 may send a signal to the guidance vehicles 112 to return to the storage location for recovery.

Figure 2:
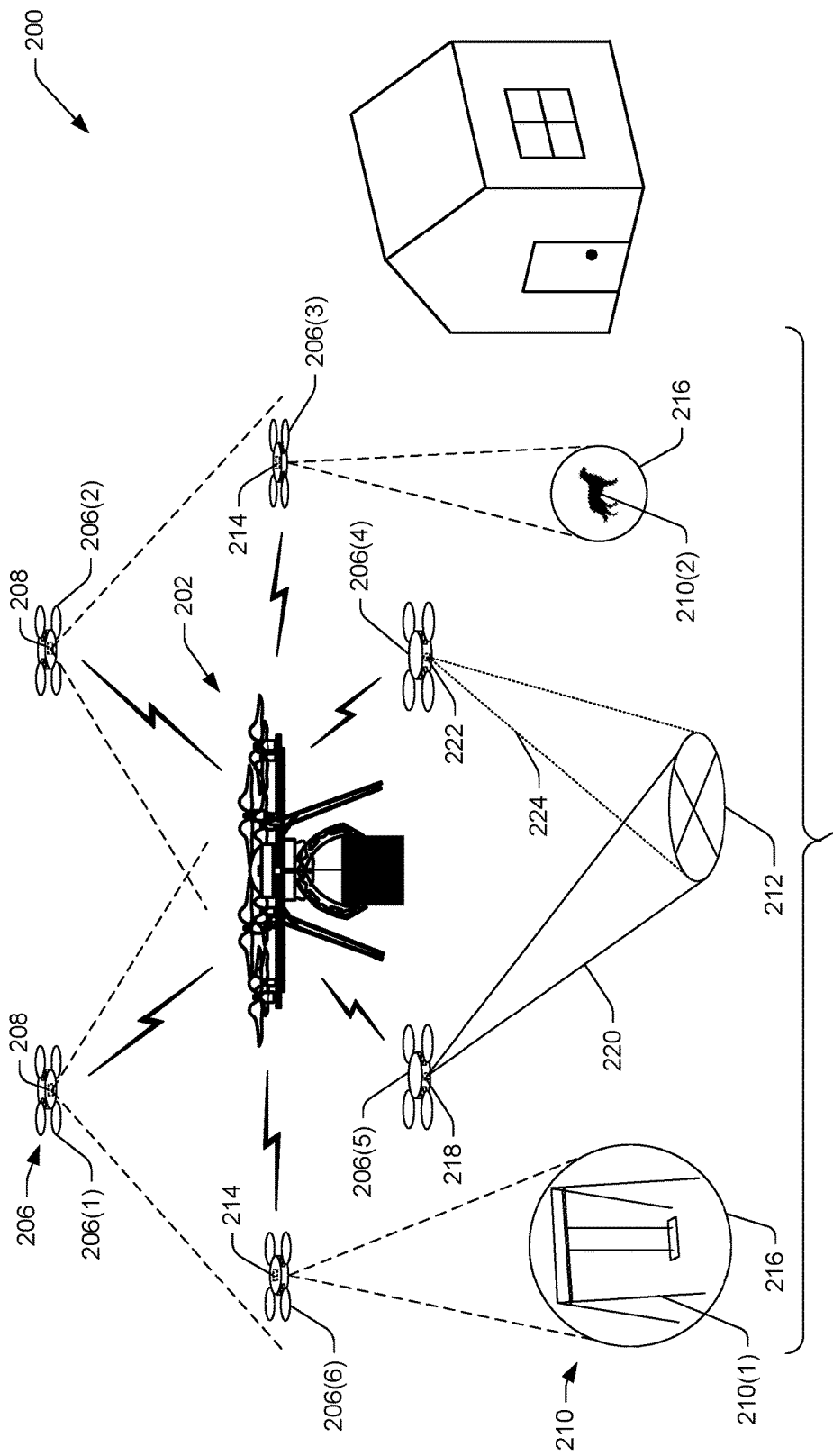
FIG. 2 is a schematic diagram showing an illustrative environment where a deployable delivery guidance system may provide landing and obstacle avoidance guidance to an unmanned aerial vehicle.

FIG. 2 is a schematic diagram showing an illustrative environment 200 where a deployable delivery guidance system may provide landing and/or obstacle avoidance guidance to an unmanned aerial vehicle (UAV) 202, such as UAV 102, in the delivery area 204. In the illustrative example, the deployable delivery guidance system includes a plurality of guidance vehicles 206(1)-206(6). In other examples, the deployable delivery guidance system can include a greater or fewer number of guidance vehicles 206.

The guidance vehicles 206 can include micro-UAVs and/or other structures capable of housing a camera, a light, a laser, and/or a sensor. In some examples, the guidance vehicles 206 can include dependent micro-UAVs and/or other structures. In such examples, the guidance vehicles 206 can be coupled to the UAV 202, via one or more connections, such as a cable connection, a wired connection, a wireless connection (e.g., Wi-Fi, Bluetooth®, Near-Field Communication, etc.), and/or a connection arm. The guidance vehicles 206 can receive flight instructions from the UAV 202 via the one or more connections.

As depicted in FIG. 2, the guidance vehicles 206 can include autonomous micro-UAVs configured to fly respective flight plans. In such examples, the respective flight plans can be determined based on maintaining a distance from the UAV 202, maintaining a position relative to the UAV 202, a position and/or distance relative to a delivery location, a controlled descent, or a combination of the foregoing.

In various examples, the guidance vehicles 206, such as guidance vehicle 112, can include a camera 210 (e.g., digital camera, spectral camera, thermographic camera, etc.) to capture images of the delivery area 204. The camera 210 can capture images (e.g., still, video, etc.), and the guidance vehicles 206 can send the images to the UAV 202 for processing. In some examples, the processing can include combining (e.g., stitching) images together from multiple guidance vehicles 206, such as guidance vehicles 206(1) and 206(2), to generate a substantially complete image of the delivery area 204. In other examples, the UAV 202 can process images from a single guidance vehicle 206. In such examples, the single guidance vehicle 206 can be positioned at an altitude above the UAV 202 (e.g., 10 feet, 50 feet, 100 feet, etc.) in order to capture the delivery area 204 in a field of view of the camera.

In various examples, the processing can include the UAV 202 evaluating the images and detecting obstacles 210 depicted in the imagery. The obstacles 210 can include stationary objects, such as obstacle 210(1), and/or mobile objects, such as obstacle 210(2). The obstacles 210 can be those located in a flight path between the UAV 202 and a delivery location 212, such as delivery location 108, and/or those located in the delivery area 204 outside the flight path.

In various examples, the guidance vehicles 206, such as guidance vehicles 206(3) and 206(6) can include a sensor 214 to identify the obstacles 210. In such examples, the processing can include the UAV 202 evaluating input from the sensor 214, and determining a flight path to avoid the obstacles 210. The input can include a location associated with the obstacle, such as an actual location (e.g., grid coordinates, latitude/longitude, etc.) or a relative location (e.g., location with respect to the delivery location, a UAV location, a flight path, etc.), and/or whether it is a stationary obstacle 210(1) or a mobile obstacle 210(2).

Additionally or alternatively, guidance vehicles 206(3) and 206(6) can include a laser, such as laser 222 described below, configured to emit a marker 216 to identify a location of an obstacle. In the illustrative example, marker 216 can illuminate and/or identify an entire obstacle 210, such as by shining a wide laser beam on the obstacle 210. In some examples, the marker 216 can illuminate and/or identify part of the obstacle 210, such as by shining a narrow laser beam on a part of the obstacle 210 closest in proximity to the flight path. In various examples, the processing can include the UAV 202 evaluating the images and identifying the marker 216.

In some examples, the processing can include the UAV 202 evaluating the images and identifying the delivery location 212. In the illustrative example, the delivery location 212 is a pre-defined, marked location for delivery. In such an example, the UAV 202 can evaluate the images and identify the marked delivery location 212. In some examples, the UAV 202 can store a picture of the delivery area 204 including the delivery location, such as in a data store. In such examples, the UAV 202 can compare the images and the picture, and identify the delivery location 212. In some examples, the delivery location 212 can be a location determined by the UAV 202 after arrival at a waypoint associated with the delivery area 204. In such examples, the UAV 202 can evaluate the images and identify a delivery location 212 free of obstacles and capable of receiving a delivery (e.g., a flat location large enough to support the package).

In the illustrative example, the guidance vehicles 206, such as guidance vehicle 206(5), can include a light 218 to illuminate the delivery location 212. In some examples, the light 218 can illuminate a larger area, such as delivery area 204. In such examples, the UAV 202 may be able to evaluate the images and identify obstacles and/or an obstruction free flight path to the delivery location in a low-light environment. The light 218 can include a light beam 220 in the visible light spectrum and/or the infra-red spectrum.

Additionally, the guidance vehicles 206, such as guidance vehicle 206(4), can include a laser 222 or other apparatus capable of highlighting a delivery location 212 for the UAV 202. In various examples, the laser 222 or other apparatus can direct a laser beam 224 on the delivery location 212, and designate the delivery location 212 as a target of the UAV 202 to deliver the package. In such examples, a sensor on the UAV 202 can recognize the beam 224, such as a particular pulse of laser light, and may approach the specific location for delivery.

For ease of description, the guidance vehicles 206(1)-206(6) are described in FIG. 2 as having either a camera 208, a sensor 214, light 218, or a laser 222. However, the guidance vehicles 206 can each include one or more of the foregoing. For example, guidance vehicle 206(1) can include a camera 208, a sensor 214, light 218, and a laser 222. For another example, guidance vehicle 206(2) can include a camera 208, a sensor 214, and a light 218.

Figure 3:
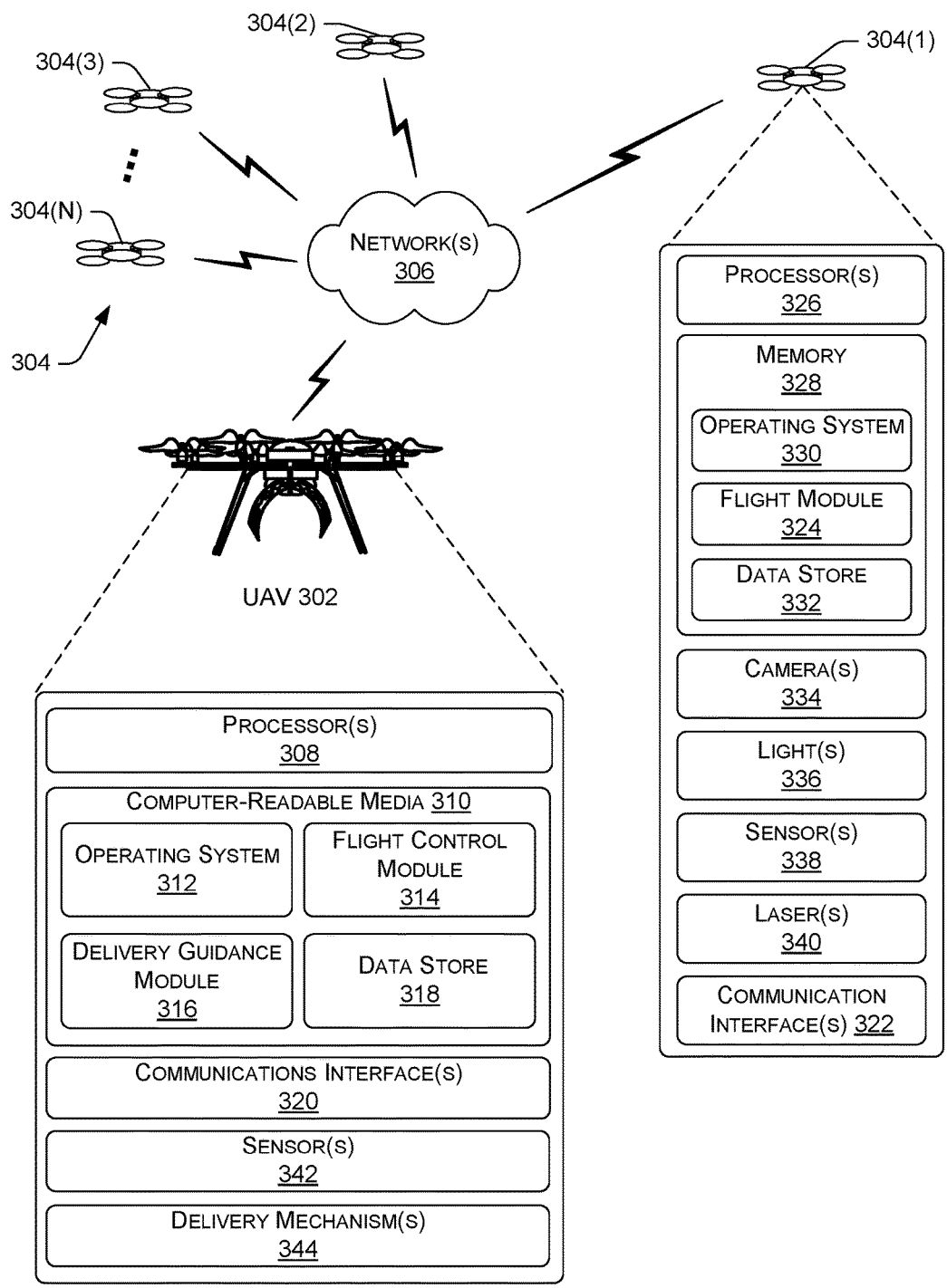
FIG. 3 is a block diagram of select components of an example unmanned aerial vehicle, and select components of an example delivery guidance vehicle.

FIG. 3 is a block diagram of select components of an example unmanned aerial vehicle (UAV) 302, such as UAV 102 or 202, and select components of an example guidance vehicle 304(1), such as guidance vehicle 112. In various examples, the guidance vehicles 304 can be stored in or on the UAV 302, and deployed therefrom proximate to a delivery area. In some examples, the guidance vehicle 304 can be stored at an alternate location, such as a neighborhood storage facility, and deployed therefrom to the delivery area.

The UAV 302 can be configured to communicate with the guidance vehicles 304 via one or more networks 306. For example, network(s) 306 can include public networks such as the Internet, private networks such as an institutional and/or personal intranet, or some combination of private and public networks. Network(s) 306 can also include any type of wired and/or wireless network, including but not limited to satellite networks, Wi-Fi networks, WiMax networks, mobile communications networks (e.g., 3G, 4G, and so forth), Bluetooth® personal area network, or any combination thereof. Network(s) 306 can utilize communications protocols, including packet-based and/or datagram-based protocols such as internet protocol (IP), transmission control protocol (TCP), user datagram protocol (UDP), or other types of protocols.

In some examples, network(s) 306 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, UAV 302 can include one or more processor(s) 308 operably coupled to computer readable media 310 via one or more of a system bus, a data bus, an address bus, a PCI bus, a Mini-PCI bus, and any variety of local, peripheral and/or independent busses. The computer readable media 310 may include a tangible non-transitory computer storage media and may include volatile and non-volatile memory and/or removable and non-removable media implemented in any type of technology for storage of information such as computer-readable processor-executable instructions, data structures, program modules or other data. The computer readable media 310 may include, but is not limited to, RAM, ROM, EEPROM, flash memory, solid-state storage, magnetic disk storage, optical storage, and/or other computer-readable media technology.

Executable instructions stored on the computer-readable media 310 can include an operating system 312, a flight control module 314, a delivery guidance module 316, and other modules and programs that are loadable and executable by the one or more processor(s) 308. Examples of such programs or modules include, but are not limited to, delivery guidance algorithms, imagery algorithms, sensor algorithms, flight path analysis algorithms, network connection software, and control modules. In some examples, computer-readable media 310 can also include a data store 318 to store customer data (e.g., customer identification, customer delivery preference data, etc.), delivery location data, scheduling data, and the like.

Various instructions, methods, and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit, as hardware, and/or as firmware. Typically, the functionality of the program modules may be combined or distributed as desired in various embodiments. An implementation of these modules and techniques may be stored on or transmitted across some form of computer-readable media.

In various examples, the flight control module 314 can receive data associated with a package to deliver, such as from an internal data store 318 or an external source via one or more communication interface(s) 320. The data can include flight plan information (e.g., a series of waypoints including a waypoint associated with the customer and/or delivery location), guidance vehicle flight information (e.g., position to maintain from the UAV 302 and/or delivery area, etc.), guidance vehicle tasking (e.g., capture images of the delivery area, identify obstacles, illuminate delivery location, etc.), delivery information (e.g., last known and/or preferred delivery location, previously identified obstacles, known delivery flight path, etc.), and the like. In various examples, the flight control module 314 may initiate flight to the waypoint and/or delivery location to deliver the package based on the data. In some examples, the flight control module 314 can provide the guidance vehicle flight information and/or guidance vehicle tasking to the guidance vehicles 304 at a time proximate to deployment thereof.

In various embodiments, the computer-readable media 310 can include a delivery guidance module 316. In various examples, the delivery guidance module 316 can recognize a proximity to and/or an arrival of the UAV 302 at a waypoint associated with the customer, such as at 106 of FIG. 1. Responsive to the recognition of the waypoint associated with the customer, the delivery guidance module 316 can cause one or more guidance vehicles 304(1)-304(N) to deploy, such as by sending a signal to the one or more guidance vehicles 304(1)-304(N) to fly. In some examples, the guidance vehicles 304 can be deployed from the UAV, such as by opening a compartment and releasing the guidance vehicles 304.

Additionally or alternatively, one or more of the guidance vehicles 304(1)-304(N) can be deployed from an alternate location, such as a neighborhood storage facility. In such examples, the delivery guidance module 316 can send a signal to the one or more of the guidance vehicles 304(1)-304(N) to fly to the delivery area.

In various examples, the signal to fly to the delivery area may be transmitted via the one or more communications interfaces 320. The one or more communication interfaces 320 may enable communication between the UAV 302, the guidance vehicles 304, and other networked devices, such as a central delivery system, a customer device, or other UAVs. The one or more communication interfaces 320 can include network interface controllers (NICs), I/O interfaces, or other types of transceiver devices to send and receive communications. For simplicity, other computers are omitted from the illustrated UAV 302.

In various examples, the guidance vehicle 304(1) can receive the signal to fly via one or more communication interfaces 322. The one or more communication interfaces 322, like one or more communication interfaces 320, can include network interface controllers (NICs), I/O interfaces, or other types of transceiver devices to send and receive communications. The signal can be delivered to a flight module 324 of the guidance vehicle 304(1) via one or more processor(s) 326 can be operably coupled to a memory 326, such as a computer-readable media, via one or more of a system bus, a data bus, an address bus, a PCI bus, a Mini-PCI bus, and any variety of local, peripheral and/or independent busses. Executable instructions stored on the memory 328 can include an operating system 330, the flight control module 324, and other modules and programs that are loadable and executable by the one or more processor(s) 326. In some examples, the memory 328 can include a data store 332.

In various examples, the flight module 324 can receive the signal to fly from the UAV 302. The signal can include guidance vehicle flight information (e.g., position to maintain from the UAV 302 and/or delivery area, etc.), guidance vehicle tasking (e.g., capture images of the delivery area, identify obstacles, illuminate delivery location, etc.), delivery information (e.g., last known and/or preferred delivery location, previously identified obstacles, known delivery flight path, etc.), and the like. The flight module 324 can process the information in the signal, and can fly a profile and/or complete tasks as indicated in the signal. The guidance vehicle 304(1) can include one or more cameras 334, one or more sensor(s) 336, one or more laser(s) 338, and/or one or more light(s) 340 to complete the tasks as indicated in the signal.

In some examples, the guidance vehicle 304(1) can include one or more cameras 334 (e.g., digital cameras, spectral cameras, thermographic cameras, etc.) to capture images (e.g., still images, video, etc.) of the delivery area, and send the images to the delivery guidance module 316 of the UAV 302. In some examples, the guidance vehicle 304(1) can include one or more lights 336 to assist in the capturing of images in low-light environments. In such examples, the one or more lights 336 can be in the visible light and/or infra-red spectra. The one or more lights 336 can be configured to illuminate a delivery area or a portion thereof, such as a delivery location.

In various examples, the delivery guidance module 316 of the UAV 302 can be configured to receive and process the images into a combined image (e.g., stitch images from multiple camera systems together) for a substantially complete view of the delivery area. The delivery guidance module 316 can use the substantially complete view of the delivery area to identify obstacles in the delivery area and/or determine a flight path of the UAV 302 to the delivery location free from obstacles and/or obstructions.

In some examples, the delivery guidance module 316 can send the images to a central processing system. The central processing system can include computing resources and/or human input to process the images (e.g., inspect images to determine obstacles, determine delivery location, etc.). The central processing system can process the images, and send data corresponding to the images back to the delivery guidance module 316. Responsive to receiving the data, the delivery guidance module 316 can update an operation (e.g., delivery path, delivery location, hover height, obstacle avoidance, delivery area illumination, etc.).

In various examples, guidance vehicle 304(1) can include one or more sensors 338 to identify obstacles in the delivery area. The one or more sensors 338 can include a radar, a motion detector, and/or other sensors capable of detecting obstacles. In such examples, the guidance vehicle 304(1) can send an input to the delivery guidance module 316 including information regarding the detected obstacles. The information can include a size of the obstacle, a location of the obstacle (e.g., relative to the UAV, the delivery location, and/or a flight path between the UAV and the delivery location), whether it is stationary or non-stationary, and other relevant information regarding the obstacle.

In some examples, responsive to detecting the obstacle, such as via the one or more sensors 338, the guidance vehicle 304(1) can identify the obstacle using one or more laser(s) 340 capable of highlighting a location. In such examples, the one or more laser(s) 340 can be configured identify a location of the detected obstacle, such as by shining the laser on the obstacle itself. The one or more lasers 340 can direct a laser beam to cover an entire obstacle, or a portion thereof, such as a portion that is closest to a flight path of the UAV 302 to the delivery location.

Additionally or alternatively, the one or more lasers 340 can direct a laser beam on the delivery location, and designate the delivery location as a target of the UAV 302 to deliver the package. In such examples, one or more sensors 342 on the UAV 302 can recognize the laser beam, such as a particular pulse of laser light, and may cause the UAV 302 to approach the specific location for delivery.

In various examples, the one or more sensor(s) 342 of the UAV 302 can be configured to assist in the delivery area guidance, and to monitor the operation and functionality of the UAV 302 and/or the guidance vehicles 304. The one or more sensor(s) 342 can include, but are not limited to, one or more cameras (e.g., digital cameras, spectral cameras, thermographic camera, etc.), LIDAR/RADAR (laser illuminated detection and ranging/radio detection and ranging), and a global positioning system (GPS) sensor. In various examples, the one or more sensor(s) 342 may operate in conjunction with one or more modules in the computer-readable media 310, such as the flight control module 314, and/or the delivery guidance module 316, to assist in the successful delivery of a package. In various examples, the one or more sensors can include a light sensor configured to detect a low light environment. Responsive to a detection of the low-light environment, the UAV 302 send a signal to the guidance vehicle 304(1) to illuminate the delivery area or portion thereof, such as via a light 336.

In some examples, the delivery guidance module 316 may receive an input from the one or more sensor(s) 342 that the UAV 302 is stabilized at the delivery location (e.g., landed or in a stabilized hover). Responsive to an indication of stabilization at the delivery location, the delivery guidance module 316 may cause a delivery mechanism 344 to release the package. The delivery mechanism 344 may include one or more of a releasable clamp, a hook, a tether, a winch, a sliding door, a folding door, or other mechanisms capable of securing a package to/in and releasing the package from the UAV 302.

Figure 4A:
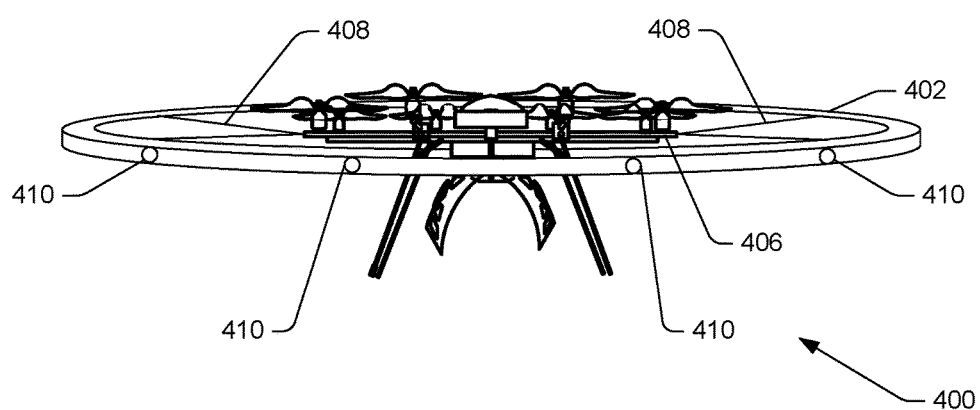
FIGS. 4A and 4B are front views of an unmanned aerial vehicle with an example ring-type guidance vehicle.
Figure 4B:
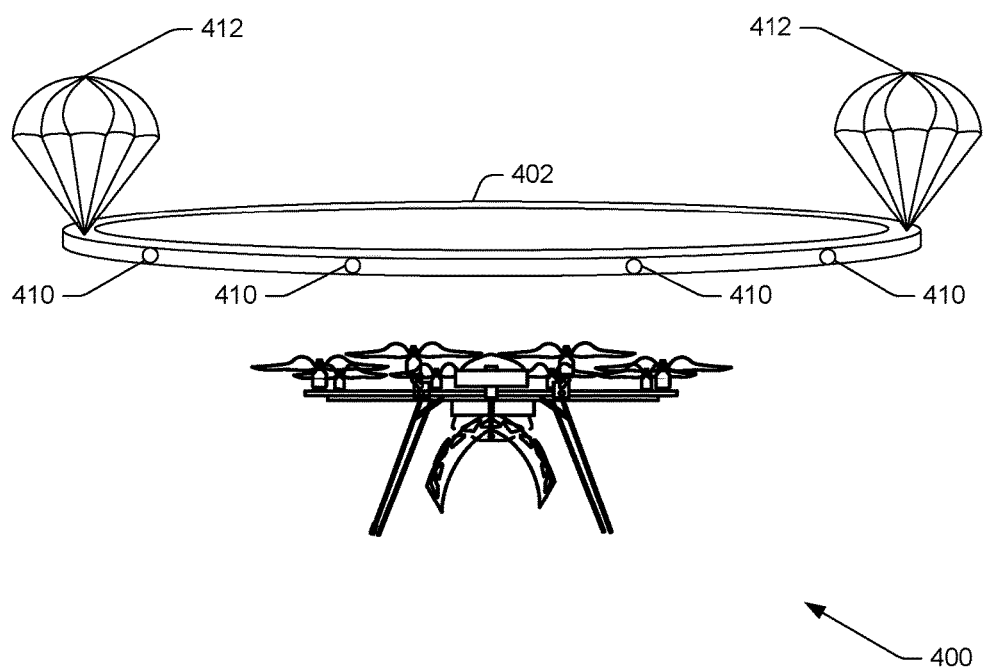

FIGS. 4A and 4B are front views of an unmanned aerial vehicle 400 with an example ring-type guidance vehicle 402. FIG. 4A illustrates the unmanned aerial vehicle (UAV) 400 with the ring-type guidance vehicle 402 coupled to the airframe. UAV 400, such as UAV 102, 202, or 302, can include an airframe 406 to which the ring-type guidance vehicle 402 may be coupled, such as via one or more connection arms 408. The airframe 406, the ring-type guidance vehicle 402 and/or the one or more connection arms 408 may comprise carbon fiber, titanium, aluminum, plastic, combinations thereof, or any other material appropriate for aircraft construction.

The one or more connection arms 408 can be fixed and/or telescopic connection arms with connectors on an end. In various examples, the connectors may be fixed to the UAV 400, and the connectors may detach from the ring-type guidance vehicle 402. In some examples, the connectors may be fixed to the ring-type guidance vehicle 402, and the connectors may detach from the UAV 400. The connectors may include a magnetic connector, a hook and loop connector, a snap fit connector, and/or any other reasonable method for securing two objects together.

In various examples, the ring-type guidance vehicle 402 can include one or more cameras 410 (e.g., digital camera, spectral camera, thermographic camera, etc.) to capture images as directed by the UAV 400. The one or more cameras 410 may be fixed in place in the ring-type guidance vehicle 402 and/or gimbaled to allow rotation about one or more axes to increase a range of view of each camera 410.

In some examples, the UAV 400 may direct the one or more cameras 410 to capture images of a delivery area. The one or more cameras 410 can capture images (e.g., still, video, etc.), and the ring-type guidance vehicle 402 can send the images to a computing system of the UAV 400 for processing. In some examples, the processing can include combining (e.g., stitching) images together from the one or more cameras 410, to generate a substantially complete image of the delivery area.

In various examples, the processing can include the computing system of the UAV 400 evaluating the images and detecting obstacles depicted in the imagery. The obstacles can include stationary objects and/or mobile objects. The obstacles can be those located in a flight path between the UAV 400 and a delivery location, and/or those located in the delivery area outside the flight path.

Additionally or alternatively, the ring-type guidance vehicle 410 can include one or more of a sensor (e.g., a radar, a motion detector, and/or other sensor) to detect obstacles, a laser to highlight obstacles and/or the delivery location, and/or a light to illuminate the delivery location for the UAV 400.

As depicted in FIG. 4B, the UAV 400 may deploy the ring-type guidance vehicle 402. In various examples, a delivery guidance module in the UAV 400 may send a signal causing the ring-type guidance vehicle 402 to deploy. In some examples, the signal may be sent to a mechanism to disconnect the connection arms. The mechanism to disconnect the connection arms can include a drive mechanism to retract one or more telescopic connection arms 408 and/or a mechanism to release one or more connectors.

Additionally or alternatively, a signal can be to a flight module in the ring-type guidance vehicle 402 to engage a lift system 412 for the ring-type guidance vehicle 402. In various examples, the lift system 412 can be a parachute-type system. In such examples, the lift system 412 can be deployed from a top of the ring-type guidance vehicle 402, and can be configured to control a rate of descent of the ring-type guidance vehicle 402. In some examples, the lift system 412 can include a propulsion system (e.g., rotors, motors, lifting gas, etc.) configured to generate lift and/or control a rate of descent of the ring-type guidance vehicle 402.

As shown in the illustrative example, the lift system 412 may include one or more (two shown) parachute-type systems. In other examples, the lift system 412 can include a greater or lesser number of parachutes. In some examples, the lift system 412 can include a parachute material which covers the ring-type guidance vehicle 402 in whole or in part. For example, the ring-type guidance vehicle 402 may include a frame surrounded by parachute material. The parachute material can be configured to inflate when the ring-type guidance vehicle 402 is released and the parachute material catches the air (e.g., apparent wind from a vertical descent).

As depicted in FIG. 4B, the ring-type guidance vehicle 402 can remain above the UAV 400, such as by having a slower rate of descent. In such examples, the ring-type guidance vehicle 402 can provide imagery of the delivery area and the UAV 400 from an elevated perspective. The elevated perspective can assist in identifying obstacles which may impede a flight path of the UAV 400. In some examples, the ring-type guidance vehicle 402 can descend below the UAV 400. In such examples, the ring-type guidance vehicle 402 can capture images of the delivery area throughout the descent, to provide the UAV 400 with a complete vertical picture of the delivery area. In various examples, a first set of the one or more cameras 410 can be oriented in an upward direction, toward the UAV 400 at the higher altitude, and a second set of the one or more cameras 410 can be oriented in a downward direction toward the delivery area and/or delivery location.

In some examples, the ring-type guidance vehicle 402 can descend to the ground in the delivery area and/or proximate to the delivery location. In such examples, the ring-type guidance vehicle 402 can be recovered by the UAV after delivery.

Figure 5A:
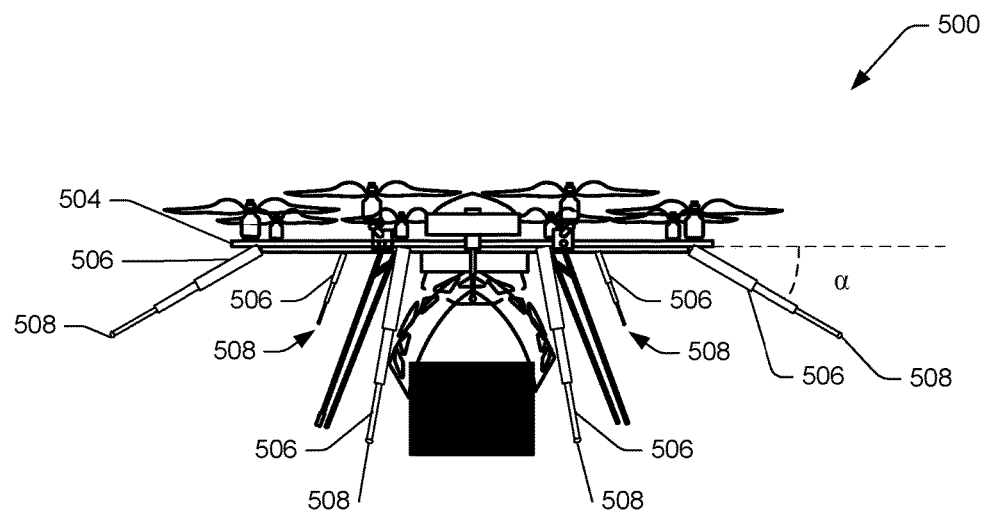
FIGS. 5A and 5B are front views of an unmanned aerial vehicle with example delivery guidance systems.
Figure 5B:
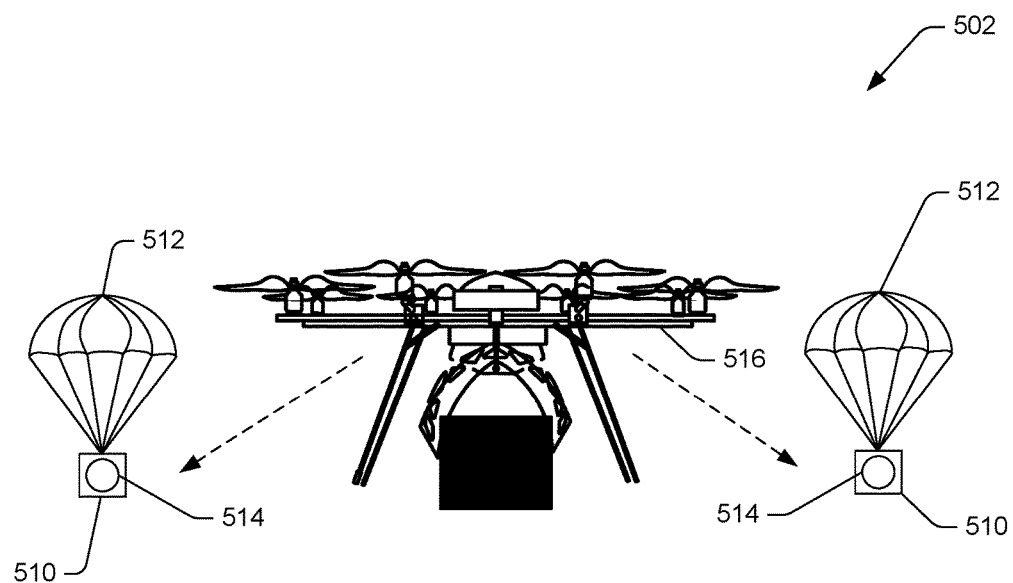

FIGS. 5A and 5B are front views of unmanned aerial vehicles (UAV) 500 and 502 with example delivery guidance vehicles. FIG. 5A illustrates an UAV 500 with a telescopic delivery guidance vehicle.

UAV 500, such as UAV 102, 202, or 302, can include an airframe 504 to which one or more telescopic arms 506 may be coupled. The airframe 504 and/or the one or more telescopic arms 506 may comprise carbon fiber, titanium, aluminum, plastic, combinations thereof, or any other material appropriate for aircraft construction. In various examples, the telescopic arms 506 can be configured to extend and retract from the airframe 504. In some examples, the telescopic arms 506 can be fully retracted into the airframe 504, such that a tip of the telescopic arm 506 is substantially flush against the airframe. In such examples, the drag on the airframe 504 may be reduced in a forward flight regime.

In various examples, a computing system (e.g., delivery guidance module) of the UAV 500 can send a signal to a drive mechanism to deploy the one or more telescopic arms 506. Responsive to the signal, the drive mechanism can extend (e.g., deploy) the one or more telescopic arms 506. The one or more telescopic arms 506 can be deployed to a fully extended position and/or to a position in between a retracted position and the fully extended position, as determined by the computing system. For example, for an approach to a large delivery area, the computing system may deploy the telescopic arms 506 to the fully extended position, to capture a wide field-of-view. For another example, for an approach to a small delivery area, the computing system may deploy the telescopic arms 506 to a position halfway between the retracted and fully extended positions, to capture a narrow field-of-view. In various examples, a first set of telescopic arms 506 can be deployed to a fully extended position, while a second set of telescopic arms 506 can be deployed to positions short of the fully extended position.

In the illustrative example, the one or more telescopic arms 506 can be fixed at an angle α, relative to the airframe. In some examples, the angle α of the one or more telescopic arms 506 can be adjustable, such as by the drive mechanism as directed by the computing system. In such examples, the one or more telescopic arms 50 can be mounted on a pivoted support, such as a gimbal. In various examples, the one or more telescopic arms 506 can be adjusted together, such that each of the telescopic arms 506 are positioned at the same angle α. In some examples, the one or more telescopic arms 506 can be adjusted individually, such that the angle α of each telescopic arm 506 may be different.

In various examples, UAV 500 can include one or more cameras 508 (e.g., digital camera, spectral camera, thermographic camera, etc.) mounted at a distal end of the telescopic arms 506 to capture images as directed by the UAV 500.

In some examples, the UAV 500 may direct the one or more cameras 508 to capture images of a delivery area. The one or more cameras 508 can capture images (e.g., still, video, etc.), and send the images to a computing system of the UAV 500 for processing. In some examples, the processing can include combining (e.g., stitching) images together from the one or more cameras 508 to generate a substantially complete image of the delivery area.

In various examples, the processing can include the computing system of the UAV 500 evaluating the images and detecting obstacles depicted in the imagery. The obstacles can include stationary objects and/or mobile objects. The obstacles can be those located in a flight path between the UAV 500 and a delivery location, and/or those located in the delivery area outside the flight path.

Additionally or alternatively, one or more of the telescopic arms 506 can include a sensor (e.g., radar, a motion detector, and/or other sensor) to detect obstacles, a laser to highlight obstacles and/or the delivery location, and/or a light to illuminate the delivery location for the UAV 500. The sensor, laser, and/or light can be mounted at a distal end of the telescopic arm. For example, four of eight telescopic arms can include cameras, while include lasers and two include lights.

FIG. 5B illustrates a UAV 502 with a deployable delivery guidance vehicle 510 that utilizes a parachute 512 to control a vertical speed (e.g., rate of descent).

In various examples, the delivery guidance vehicle 402 can include one or more cameras 514 (e.g., digital camera, spectral camera, thermographic camera, etc.) to capture images as directed by the UAV 502. The one or more cameras 514 may be fixed in place in the delivery guidance vehicle 510 and/or gimbaled to allow rotation about one or more axes to increase a range of view of each camera 514.

In some examples, a computing system of the UAV 502 may direct the one or more cameras 514 to capture images of a delivery area. The one or more cameras 514 can capture images (e.g., still, video, etc.) and send the images to the computing system of the UAV 502 for processing. In some examples, the processing can include combining (e.g., stitching) images together from the one or more cameras 514, to generate a substantially complete image of the delivery area.

In various examples, the processing can include the computing system of the UAV 502 evaluating the images and detecting obstacles depicted in the imagery. The obstacles can include stationary objects and/or mobile objects. The obstacles can be those located in a flight path between the UAV 502 and a delivery location, and/or those located in the delivery area outside the flight path.

Additionally or alternatively, the delivery guidance vehicle 510 can include one or more of a sensor (e.g., a radar, a motion detector, and/or other sensor) to detect obstacles, a laser to highlight obstacles and/or the delivery location, and/or a light to illuminate the delivery location for the UAV 502.

In various examples, the delivery guidance vehicle 510 can be mounted inside an airframe 516 of the UAV 502, such as in a compartment. In such examples, the computing system of the UAV 502 may cause the delivery guidance vehicle 510 to deploy by opening a compartment door (e.g., docking station door) of the UAV 502 and/or sending a signal to release a connection (e.g., a magnetic connection, snap-fit connection, or other type of connection securing the delivery guidance vehicle in place during flight, etc.) to the delivery guidance vehicle 510. In some examples, the delivery guidance vehicle 510 can be mounted on an outside of the airframe 516. In such examples, the computing system can cause the delivery guidance vehicle 510 to deploy by sending a signal to launch (e.g., to release the connection to the delivery guidance vehicle 510).

In various examples, the signal to release a connection and/or to launch can include an instruction to deploy a parachute 512 (e.g., engage a lift system) on the delivery guidance vehicle 510. In such examples, the parachute 512 can be deployed from a top of the delivery guidance vehicle 510, and can be configured to control a rate of descent of the delivery guidance vehicle 510.

In the illustrative example, the delivery guidance vehicle 510 includes one parachute per vehicle. In other examples, the delivery guidance vehicle 510 can include a greater or lesser number of parachutes. In some examples, the delivery guidance vehicle 510 can include a parachute material which covers the delivery guidance vehicle 510 in whole or in part. For example, the delivery guidance vehicle 510 may include a frame surrounded by parachute material. The parachute material can be configured to inflate when the delivery guidance vehicle 510 is deployed and the parachute material catches the air (e.g., apparent wind from a vertical descent).

In some examples, the delivery guidance vehicle 510 can include a lift system comprising a lifting gas (e.g. helium, etc.) stored in a balloon-type structure (e.g., a blimp). In such examples, the delivery guidance vehicle 510 can include a propulsion system to direct horizontal and/or vertical movement of the delivery guidance vehicle 510.

In various examples, delivery guidance vehicle 510 can remain above the UAV 502, such as by having a slower rate of descent than the UAV 502. In such examples, the delivery guidance vehicle 510 can provide imagery of the delivery area and the UAV 502 from an elevated perspective. The elevated perspective can assist in identifying obstacles which may impede a flight path of the UAV 502. In some examples, the delivery guidance vehicle 510 can descend below the UAV 502. In such examples, the delivery guidance vehicle 510 can capture images of the delivery area throughout the descent, to provide the UAV 502 with a complete vertical picture of the delivery area. In various examples, a first set of the one or more cameras 514 can be oriented in an upward direction, toward the UAV 502 established at the higher altitude, and a second set of the one or more cameras 514 can be oriented in a downward direction toward the delivery area and/or delivery location.

In some examples, the delivery guidance vehicle 510 can descend to the ground in the delivery area and/or proximate to the delivery location. In such examples, the delivery guidance vehicle 510 can be recovered by the UAV after delivery.

Figure 6:
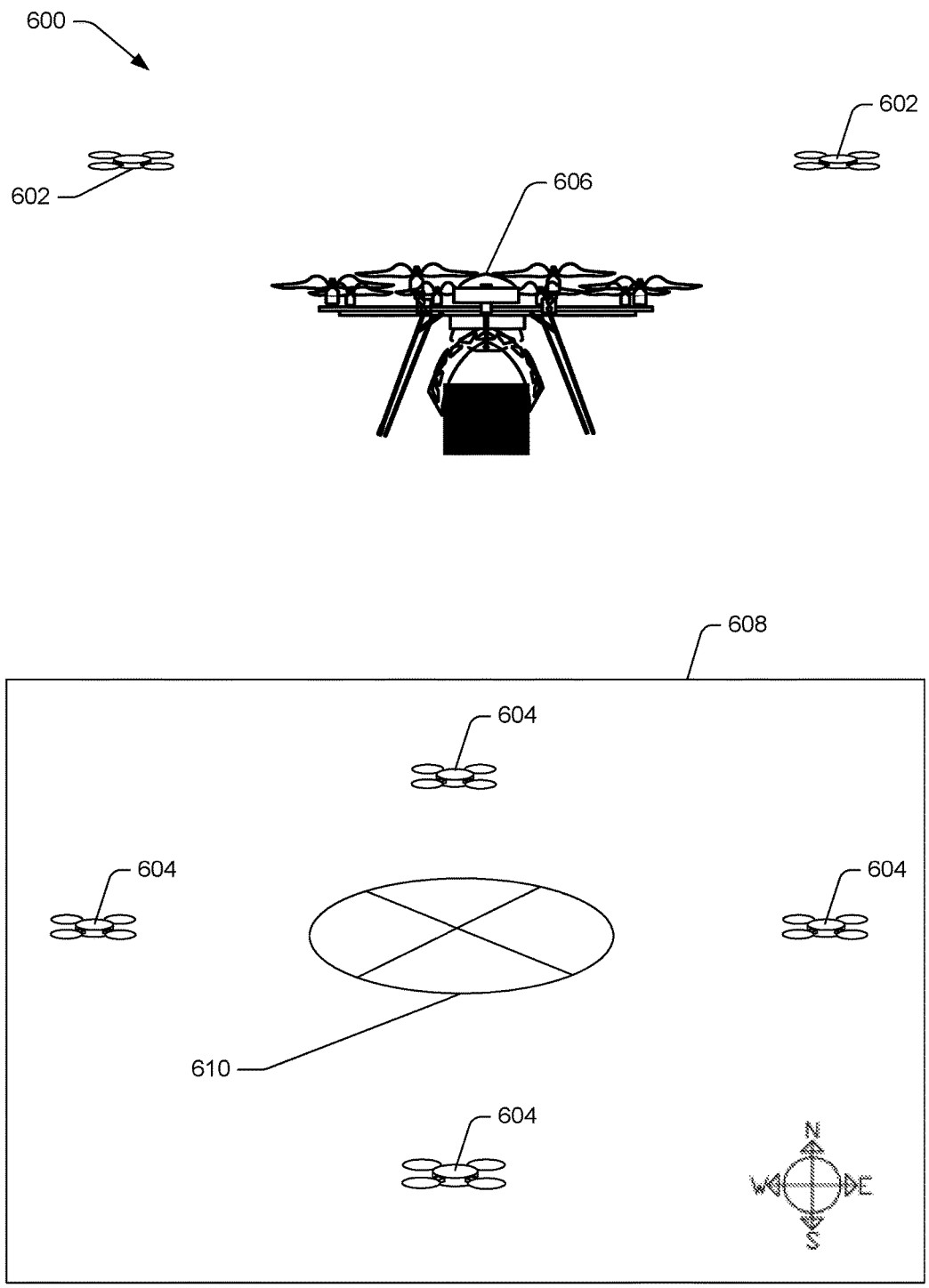
FIG. 6 is a schematic diagram showing an illustrative environment with a first set of guidance vehicles configured to provide aerial guidance and a second set of guidance vehicles configured to provide land-based guidance.

FIG. 6 is a schematic diagram showing an illustrative environment 600 with a first set of guidance vehicles 602 configured to provide aerial guidance and a second set of guidance vehicles 604 configured to provide land-based guidance to an unmanned aerial vehicle (UAV) 606, such as UAV 102, 202, 302, 500, or 502.

The first set of guidance vehicles 602, such as guidance vehicles 112, 206, or 304 can include one or more micro-UAVs with propulsion systems. The one or more micro-UAVs can be capable of autonomous, semi-autonomous, and/or directed flight. The one or more micro-UAVs can be configured to deploy from the UAV 606 and/or from an alternate location, such as a neighborhood storage facility. The first set of guidance vehicles 602 can provide aerial guidance (e.g., a downward facing view of the UAV and/or the delivery area) to the UAV 606 during an approach to the delivery area 608.

In some examples, the first set of guidance vehicles 602 can be configured to fly at a designated direction and distance relative to the UAV 606. For example, the first set of guidance vehicles 602 can be configured to fly abeam the UAV 606 on either side, at a distance of 5 meters (e.g., 3 meters horizontally, 4 meters vertically). For another example, the first set of guidance vehicles can be configured to fly in cardinal directions (e.g., north, east, south, west) at a distance of 2 meters from the UAV 606.

The second set of guidance vehicles 604, such as guidance vehicles 112, 206, 304, 402, or 510, can include one or more micro-UAVs with propulsion systems and/or controlled descent systems (e.g., parachute material or other way to slow a rate of descent). In various examples, the second set of guidance vehicles 604 can be deployed from the UAV 606 and/or an alternate location, such as the neighborhood storage facility. In some examples, the second set of guidance vehicles 604 can be configured to fly at a designated direction and/or distance relative to the delivery location 610. In some examples, the second set of guidance vehicles 604 can land in the delivery area 608, proximate to the delivery location 610.

In some examples, the second set of guidance vehicles 604 can be configured to land at a designated location and/or distance from the delivery location 610. In the illustrative example, the second set of guidance vehicles 604 can each be configured to land in a cardinal direction from the delivery location. In other examples, the second set of guidance vehicles 604 can be configured to land in other locations relative to the delivery location 610 and/or the delivery area 608. The second set of guidance vehicles 604 can provide land-based guidance (e.g., an upward facing and/or horizontal ground view of the delivery area) to the UAV 606 delivering a package to the delivery location 610.

In various examples, one or more of the vehicles in the first set of guidance vehicles 602 and/or the second set of guidance vehicles 604 can include a camera (e.g., digital camera, spectral camera, thermographic camera, etc.) to capture images of the delivery area 608 and/or delivery location 610. The camera can capture images (e.g., still, video, etc.) and send the images to the UAV 606 for processing. In some examples, the processing can include combining (e.g., stitching) images together from the first set of guidance vehicles 602 and/or the second set of guidance vehicles 604, to generate a substantially complete image of the delivery area 608 and/or the delivery location 610.

In some examples, the processing can include a computing system of the UAV 606 can evaluate the images and detect obstacles in the delivery area 608 and/or at the delivery location 610. The obstacles can include stationary or mobile objects. The obstacles can be those located in a flight path between the UAV 606 and a delivery location 610 and/or those located in the delivery area 608 outside the flight path.

In various examples, one or more of the vehicles in the first set of guidance vehicles 602 and/or the second set of guidance vehicles 604 can include a sensor (e.g., a radar, a motion detector, and/or other sensor) to identify the obstacles. In such examples, the processing can include the computing system of the UAV 606 evaluating input from the sensor, and determining a flight path to avoid the obstacles. The input can include a location associated with the obstacle, such as an actual location (e.g., grid coordinates, latitude/longitude, etc.) or a relative location (e.g., location with respect to the delivery location, a UAV location, a flight path, etc.), a size of the obstacle (e.g., height, width, depth, etc.), and/or whether it is a stationary or a mobile obstacle.

In various examples, one or more of the vehicles in the first set of guidance vehicles 602 and/or the second set of guidance vehicles 604 can include a laser, such as laser 222 described above. The laser can be configured to emit a marker to identify a location of an obstacle, in whole or in part, and/or the delivery location 610, in whole or in part. In various examples, the computing system of the UAV 606 can evaluate the images provided by the cameras, and identify the marker. In some examples, the UAV 606 can include one or more sensors configured to identify the marker as an obstacle marker and/or a delivery location marker.

In some examples, one or more of the vehicles in the first set of guidance vehicles 602 and/or the second set of guidance vehicles 604 can include a light to illuminate the delivery area 608 and/or the delivery location 610. In some examples, the lights can illuminate a large area, such as the delivery area 608. In such examples, the UAV 606 may be able to evaluate the images and identify obstacles and/or an obstruction free flight path to the delivery location in a low-light environment. The light can include a light beam in the visible light spectrum and/or the infra-red spectrum.

Figure 7:
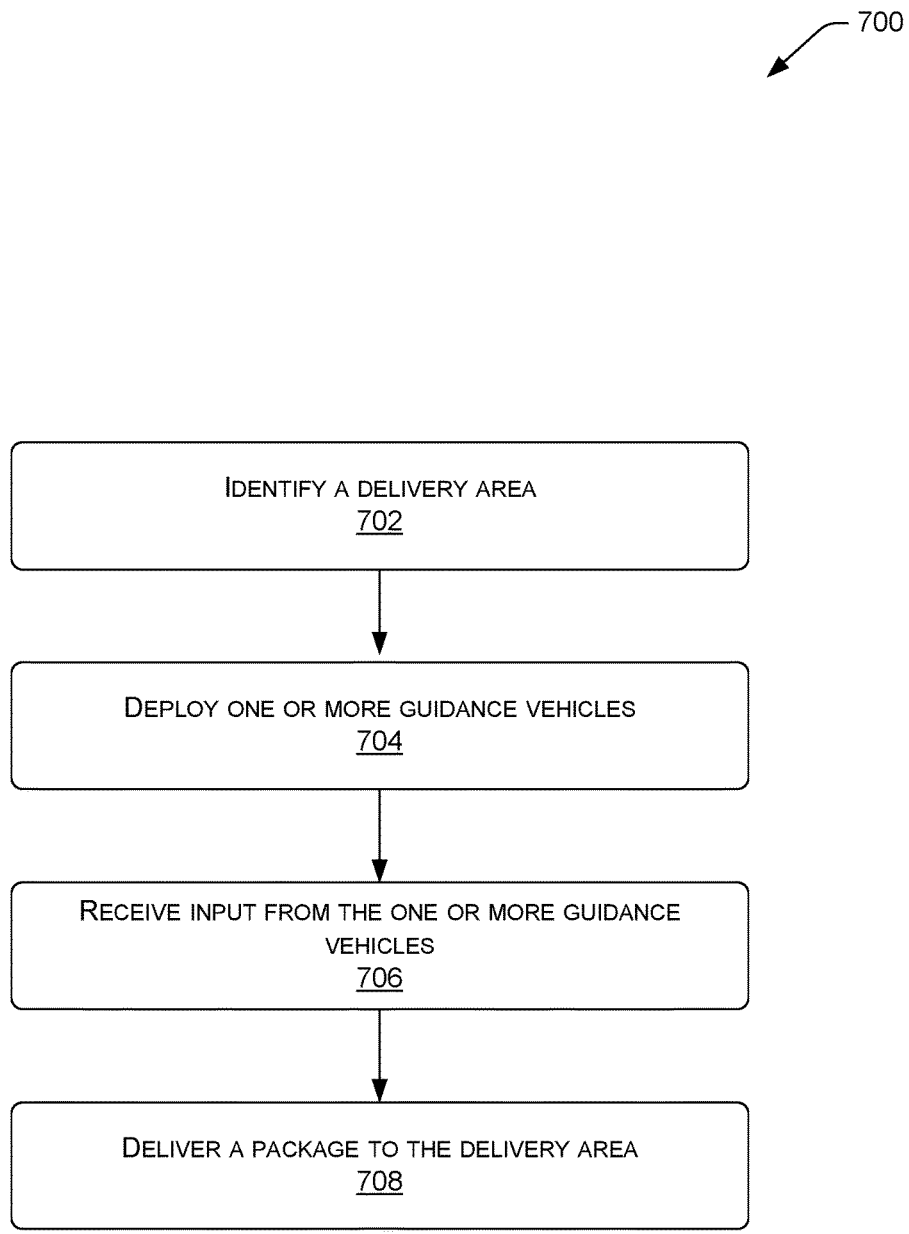
FIG. 7 is a flow diagram showing an illustrative process to deploy one or more guidance vehicles in order to receive delivery area guidance.
Figure 8:
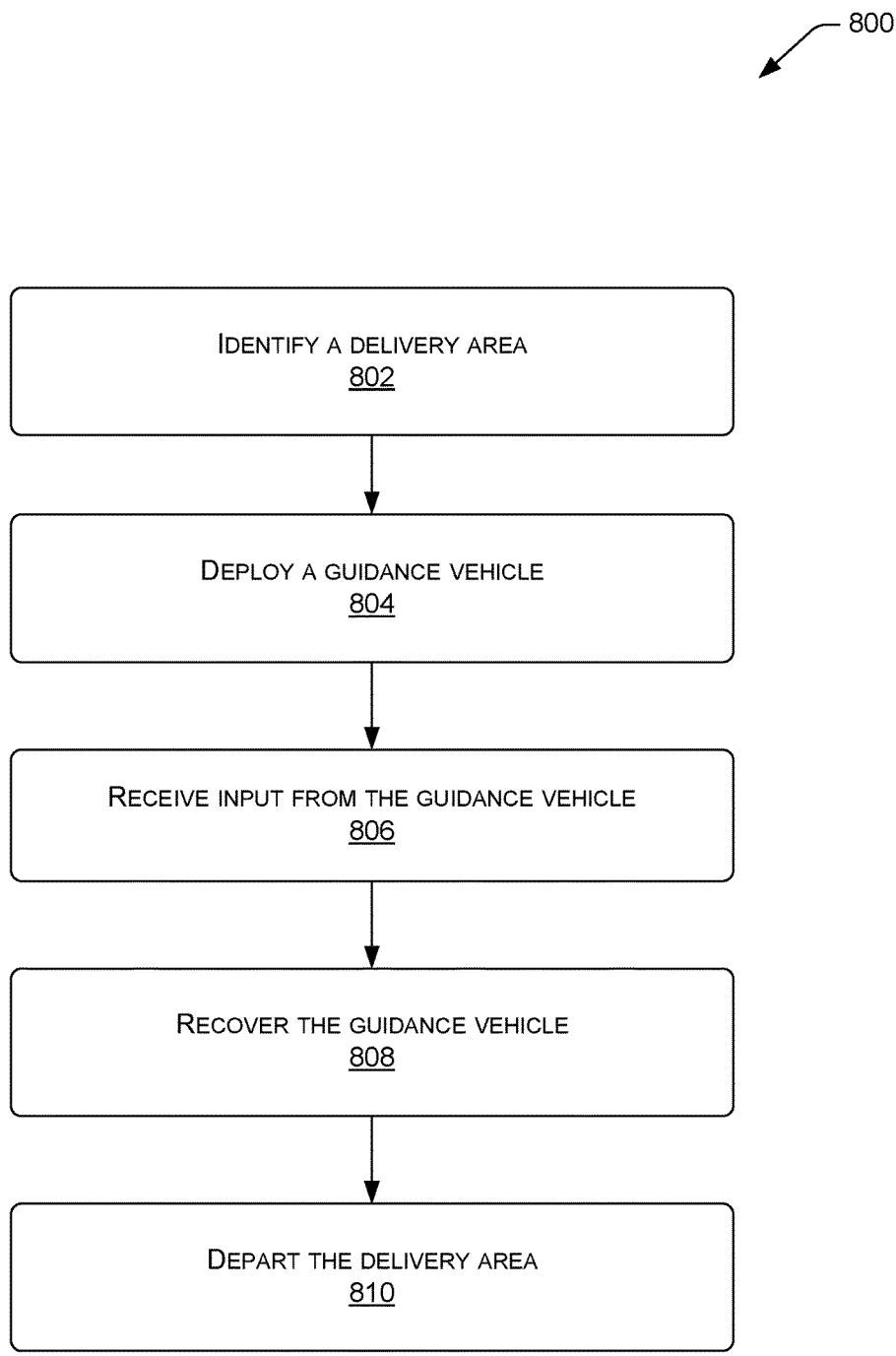
FIG. 8 is a flow diagram showing an illustrative process to deploy and recover a guidance vehicle.

FIGS. 7-8 are flow diagrams of illustrative processes. The processes 700 and 800 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 7 is a flow diagram showing an illustrative process 700 to deploy one or more guidance vehicles in order to receive delivery area guidance. The guidance vehicles can include micro-UAVs capable of self-propulsion, micro-UAVs capable of controlling a vertical descent, camera and/or sensor systems coupled to the UAV, or a combination thereof.

At block 702, a UAV can identify a delivery area. In various examples, a computing system of the UAV can identify the delivery area based on an arrival at a waypoint associated with the delivery area. The waypoint may include coordinates (e.g., latitude, longitude, degrees minutes seconds, Universal Transverse Mercator, etc.) and/or altitude in proximity of the destination (e.g., a house, a place of business, etc.), such as coordinates associated with a customer and/or a delivery location.

In some examples, the UAV can identify the delivery area by receiving a signal from a transmitter located at the delivery area. The signal can include a customer code specific to the customer associated with the delivery (e.g., a customer number, an order number, a delivery number, QR code, etc.), a code specific to the order (e.g., order number, confirmation number, etc.), or a code specific to the delivery area and/or delivery location.

At block 704, the UAV can deploy one or more guidance vehicles. In some examples, the guidance vehicles can be stored away from the UAV, such as in a neighborhood storage facility. In such examples, the UAV may send a signal to the guidance vehicles and/or to a computing system of the storage facility to launch the guidance vehicles to the delivery area. Additionally or alternatively, the guidance vehicles can be stored on and/or inside an airframe of the UAV during flight to the waypoint associated with the delivery. The UAV can deploy the guidance vehicles, such as by opening a compartment door (e.g., docking station door) of the UAV and sending a signal to the guidance vehicles to launch (e.g., engage a propulsion system, engage a lift system, etc.). In various examples, the signal to launch may additionally cause a connector between the UAV and the guidance vehicles to release. The connector can include a magnetic connector, a hook and loop connector, a snap fit connector, and/or any other reasonable method for securing two objects together.

In various examples, the guidance vehicles can be coupled to the airframe. In some examples, the coupling can be a cable or a wire connecting the UAV and the guidance vehicle. In such examples, the guidance vehicle can be configured to fly away from the UAV, but may maintain a wired connection to send and receive data (e.g., flight data, imagery, obstacle data, etc.). In such examples, the UAV may deploy the guidance vehicle by extending the cable or wire.

In some examples, the UAV can cause the guidance vehicles to fly to a position relative to the UAV. The position can include a distance and a direction. For example, the UAV can deploy a pair of guidance vehicles to fly 10 feet away from the UAV in each cardinal direction. For another example, the UAV may deploy one pair of guidance vehicles to fly one foot abeam on either side of the UAV and 10 feet above, and one pair of guidance vehicles to fly to the ground proximate to the delivery location.

At block 706, the UAV can receive input from the one or more guidance vehicles. In various examples, the input can include a plurality of images from camera systems on the guidance vehicles. In such examples, a computing system of the UAV can receive the plurality of images from the guidance vehicles and process the imagery. In some examples, the processing can include combining (e.g., stitching) the images together to generate a substantially complete image of the delivery area. Additionally, the processing can include evaluating the plurality of images to identify a delivery location, identifying one or more obstacles in the delivery area, and/or determining a flight path (e.g., an approach path) to the delivery location.

In various examples, one or more of the guidance vehicles can include a sensor configured to detect an obstacle in the delivery area. In such examples, the input can include data from a sensor identifying the obstacle. In some examples, the one or more guidance vehicles can include a laser to highlight the obstacle and/or the delivery location. In such examples, the input can include data related to the laser.

At block 708, the UAV can deliver a package to the delivery location. In various examples, based on the processed input from the guidance vehicles, the computing system of the UAV can determine an obstacle-free flight path to the delivery location. The UAV can fly to the delivery location and land at or hover over the delivery location. In some examples, the UAV can engage a delivery mechanism to release the package. The delivery mechanism can include one or more of a releasable clamp, a hook, a tether, a winch, a sliding door, a folding door, or other mechanism capable of securing a package to/in and releasing the package from a UAV.

FIG. 8 is a flow diagram showing an illustrative process 800 to deploy and recover a guidance vehicle.

At block 802, a UAV can identify a delivery area. In various examples, a computing system of the UAV can identify the delivery area based on an arrival at a waypoint associated with the delivery area. The waypoint may include coordinates (e.g., latitude, longitude, degrees minutes seconds, Universal Transverse Mercator, etc.) and/or altitude in proximity of the destination (e.g., a house, a place of business, etc.), such as coordinates associated with a customer and/or a delivery location.

In some examples, the UAV can identify the delivery area by receiving a signal from a transmitter located at the delivery area. The signal can include a customer code specific to the customer associated with the delivery (e.g., a customer number, an order number, a delivery number, QR code, etc.), a code specific to the order (e.g., order number, confirmation number, etc.), or a code specific to the delivery area and/or delivery location.

At block 804, the UAV can deploy a guidance vehicle. In some examples, the guidance vehicle can be stored on and/or inside an airframe of the UAV during flight to the waypoint associated with the delivery. The UAV can deploy the guidance vehicle, such as by opening a compartment door (e.g., docking station door) of the UAV and/or releasing a connector between the UAV and the guidance vehicle. The connector can include a magnetic connector, a hook and loop connector, a snap fit connector, and/or any other reasonable method for securing two objects together. In some examples, the connector can be inside a compartment. In other examples, the connector can be on an external surface of the airframe.

Additionally, the UAV can send a signal to the guidance vehicle to launch (e.g., engage a propulsion system, engage a lift system, etc.) and fly to a position relative to the UAV and/or the delivery location. In various examples, the position can be a location on the ground proximate and/or relative to the delivery location (e.g., north, east, south or west of the delivery location at a distance of 1 meter, 3 meters, 10 feet from the delivery location, etc.). In such examples, the guidance vehicle may control a rate of descent, such as via a parachute, parachute material, and/or a propulsion system (e.g., motors, rotors, lifting gas, etc.), to the position.

In various examples, the position may be based on a time of day (e.g., position of the sun), one or more obstacles in the delivery area, and/or a flight path of the UAV. For example, the UAV may detect a large swing set in the delivery area. The UAV may determine the position for the guidance vehicle to avoid an obstruction of view of the UAV from the guidance vehicle based on the swing set and the flight path of the UAV. For another example, the UAV may be scheduled to deliver a package at sunset. The UAV may determine the position of the guidance vehicle such that a camera of the guidance vehicle faces a direction other than west.

In some examples, the position can include a distance and a direction from the UAV. For example, the UAV can deploy a pair of guidance vehicles to fly 10 feet away from the UAV in each cardinal direction. For another example, the UAV may deploy one pair of guidance vehicles to fly one foot abeam on either side of the UAV and 10 feet above, and one pair of guidance vehicles to fly to the ground proximate to the delivery location.

In various examples, the guidance vehicle can be coupled to the airframe. In some examples, the coupling can be a cable or a wire connecting the UAV and the guidance vehicle. In such examples, the guidance vehicle can be configured to fly away from the UAV, but may maintain a wired connection to send and receive data (e.g., flight data, imagery, obstacle data, etc.). In such examples, the UAV may deploy the guidance vehicle by extending the cable or wire. In some examples, the guidance vehicle can be coupled to the airframe via a telescopic arm. In such examples, the guidance vehicle can be deployed by extending the telescopic arm.

At block 806, the UAV can receive input from the guidance vehicle. In various examples, the input can include a plurality of images from a camera system on the guidance vehicle. In such examples, the computing system of the UAV can receive the plurality of images from the guidance vehicle and process the imagery. In some examples, the processing can include combining (e.g., stitching) the images together to generate a substantially complete image of the delivery area. Additionally, the processing can include evaluating the plurality of images to identify a delivery location, identifying one or more obstacles in the delivery area, and/or determining a flight path (e.g., an approach path) to the delivery location.

In various examples, the guidance vehicle can include a sensor configured to detect an obstacle in the delivery area. In such examples, the input can include data from a sensor identifying the obstacle. In some examples, the guidance vehicle can include a laser to highlight the obstacle and/or the delivery location. In such examples, the input can include data related to the laser.

At block 808, the UAV can recover the guidance vehicle. In various examples, the UAV can open a compartment (e.g., a docking station) for the guidance vehicle, and can recover the guidance vehicle into the compartment. In various examples, the UAV may send a signal to the guidance vehicle to fly into the compartment. In some examples, the UAV can include a device to assist in recovering the guidance vehicle, such as a telescopic arm with a magnet or gripping mechanism. In such examples, the device can connect to the guidance vehicle, and lead (e.g., pull, guide, etc.) the guidance vehicle into the compartment. For example, the UAV can land or hover proximate to a location associated with the guidance vehicle. The device can connect to the guidance vehicle and recover the vehicle onto the UAV. For another example, an autonomous guidance vehicle may fly to a position proximate to the UAV. The device on the UAV can then connect to the guidance vehicle, and lead the vehicle into the UAV.

In various examples, the UAV can recover the guidance vehicle to a connector on an external surface of the airframe. In such examples, the UAV can fly proximate to the guidance vehicle, and can engage the connector to the guidance vehicle to secure the guidance vehicle to the external surface of the airframe. For example, the UAV can hover within inches of the guidance vehicle to place the two within a distance sufficient to engage a magnetic connection between the guidance vehicle and the connector. In some examples, the UAV can recover the guidance vehicle via a delivery mechanism. The delivery mechanism can include one or more of a releasable clamp, a hook, a tether, or other mechanisms capable of securing a guidance vehicle to the UAV.

In some examples, the UAV may cause the guidance vehicle to be recovered at a storage location (e.g., neighborhood storage facility). In such examples, the UAV may send a signal to the guidance vehicle to return to the storage location for recovery.

At block 810, the UAV can depart the delivery area. In various examples, the UAV can depart and fly to a base location (e.g., an inventory facility, etc.), a recharging station, or other location as determined by a flight plan.

In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular abstract data types. The process can also be practiced in a distributed computing environment where functions are performed by remote processing devices that are linked through a communication network. In a distributed computing environment, computer-executable instructions can be located in local and/or remote computer storage media, including memory storage devices.

In the context of hardware, some or all of the blocks can represent application specific integrated circuits (ASICs) or other physical components that perform the recited operations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An unmanned aerial vehicle (UAV) comprising:
an airframe;
a guidance vehicle coupled to the airframe;
one or more processors coupled to the airframe; and
one or more memories coupled to the airframe, the one or more memories storing instructions executable by the one or more processors to perform acts comprising:
  sending a signal to a guidance vehicle to activate a lift system that at least one of generates lift or controls a rate of descent of the guidance vehicle;
  decoupling the guidance vehicle from the airframe;
  causing the guidance vehicle to be positioned at a distance from the UAV;
  receiving one or more images from the guidance vehicle;
  identifying a delivery location based at least in part on the one or more images; and
  determining a flight path to the delivery location based at least in part on the one or more images.

2. The UAV of claim 1, the acts further comprising:
determining that the UAV is in a low-light environment; and
causing emission of light from a light source of the guidance vehicle, wherein the emission of light illuminates the delivery location.

3. The UAV of claim 1, the acts further comprising:
identifying an obstacle proximate to the delivery location based at least in part on the one or more images,
wherein the determining the flight path includes determining a route to avoid the obstacle.

4. The UAV of claim 1, wherein the guidance vehicle is one of a plurality of guidance vehicles configured to provide the one or more images to the UAV, the acts further comprising:
processing, by a computing system of the UAV, the plurality of images, wherein the processing comprises stitching the plurality of images together to generate a combined image of the delivery area; and
comparing the combined image of the delivery area to an existing image of the delivery area that includes the delivery location,
wherein the identifying the delivery location is based at least in part on the comparing.

5. A method comprising:
identifying, by a computing system of an unmanned aerial vehicle (UAV), a delivery area;
causing, by the computing system of the UAV, a guidance vehicle to be deployed;
receiving, at the computing system of the UAV, input from the guidance vehicle; and
delivering, by the UAV, a package to the delivery area based at least in part on the input.

6. The method of claim 5, wherein the causing the guidance vehicle to be deployed comprises:
releasing a connector between the guidance vehicle and the airframe;
sending a signal to a computing system of the guidance vehicle to engage a lift system; and
causing the guidance vehicle to be positioned at a distance from the UAV.

7. The method of claim 6, wherein the lift system comprises a parachute-type system, and the distance includes a vertical distance from UAV toward ground proximate to the delivery location.

8. The method of claim 5, wherein the causing the guidance vehicle to be deployed comprises:
extending a camera from a first position proximate to an airframe to a second position distal to the airframe via a telescopic arm.

9. The method of claim 5, wherein the receiving input from the guidance vehicle comprises receiving, from a sensor on the guidance vehicle, an indication of an obstacle in the delivery area, the indication comprising a location and a height of the obstacle.

10. The method of claim 5, wherein the receiving input from the guidance vehicle comprises receiving, from a laser on the guidance vehicle, an indication of a delivery location in the delivery area, the indication comprising a laser beam directed to at least a portion of the delivery location.

11. The method of claim 5, wherein the input comprises an image of the delivery area, the method further comprising:
evaluating, by the computing system of the UAV, the image of the delivery area;
identifying a delivery location in the delivery area; and
determining a flight path to the delivery location.

12. The method of claim 5, wherein the guidance vehicle is one of a plurality of guidance vehicles and the receiving the input comprises receiving a plurality of images, the method further comprising:
processing, by the computing system of the UAV, the plurality of images, wherein the processing comprises combining the plurality of images together to generate a combined image of the delivery area;
identifying an obstacle in the delivery area based at least in part on the combined image; and
determining a flight path to a delivery location to avoid the obstacle.

13. The method of claim 5, further comprising:
determining, by a sensor on the UAV, that the UAV is in a low-light environment; and
causing emission of light from a light source of the guidance vehicle, wherein the emission of light illuminates at least a portion of the delivery area.

14. The method of claim 5, wherein the identifying the delivery area comprises:
determining that the UAV has arrived at a waypoint associated with a delivery of the package.

15. A system comprising:
one or more processors; and
memory coupled to the one or more processors, the memory including computer-executable instructions that, when executed by the one or more processors, cause the one or more processors to perform acts comprising:

identifying, by a computing system of an unmanned aerial vehicle (UAV), a delivery area;

causing a plurality of guidance vehicles to deploy based at least in part on an identification of the delivery area;

receiving, by the computing system of the UAV, a plurality of images from the plurality of guidance vehicles;

identifying a delivery location in the delivery area based at least in part on the plurality of images; and delivering, by the UAV, a package to the delivery location.

16. The system of claim 15, further comprising:

receiving, via a sensor on a guidance vehicle of the plurality of guidance vehicles and by the computing system of the UAV, an indication of an obstacle proximate to the delivery location;

determining a flight path to the delivery location to avoid the obstacle.

17. The system of claim 15, further comprising:

processing, by a computing system of the UAV, the plurality of images, wherein the processing comprises combining the plurality of images together to generate a combined image of the delivery area;

identifying an obstacle in the delivery area based at least in part on an analysis of the combined image; and determining a flight path to the delivery location to avoid the obstacle.

18. The system of claim 15, wherein the identifying the delivery area comprises determining that the UAV has arrived at a waypoint associated with the delivery area.

19. The system of claim 15, wherein the causing the plurality of guidance vehicle to deploy comprises:

releasing respective connectors between the plurality of guidance vehicles and an airframe of the UAV;

sending a signal to respective guidance vehicles of the plurality of guidance vehicles to engage respective lift systems and generate lift; and causing the plurality of guidance vehicles to fly at respective positions from the UAV.

20. The system of claim 15, further comprising:

causing a first guidance vehicle of the plurality of guidance vehicles to activate a light;

sending an illumination signal to the first guidance vehicle, wherein the illumination signal causes the first guidance vehicle to direct a light beam of the light on the delivery location.

\* \* \* \* \*